INDICATING APPARATUS

Filed July 27, 1964

INVENTORS
Yasushi Sekiguchi
Kozo Fukunishi
BY
Stevens, Davis, Miller & Mosher, ATTORNEYS INVENTORS
Yasushi Sekiguchi
Kozo Fukunishi
BY
Stevens, Davis, Miller + Mosher ATTORNEYS United States Patent Office 3,376,846
Patented Apr. 9, 1968

3,376,846
INDICATING APPARATUS

Yasushi Sekiguchi, Shiroyama-machi, Tsukui-gun, and Kozo Fukunishi, Yokohama, Japan, assignors to Victor Company of Japan, Limited, Yokohama, Japan, a corporation of Japan Filed July 27, 1964, Ser. No. 385,415
Claims priority, application Japan, Aug. 10, 1963, 38/59,343
5 Claims. (Cl. 116—124.1)

ABSTRACT OF THE DISCLOSURE

An indicating apparatus which comprises an indicating drum having a viewing window within a portion of an indicating band appearing about the outer surface of said drum and a second indicating drum inserted within said first drum and freely rotatable therein with an indicating band thereon visible through the viewing window, the drums being separately mounted on a common shaft.

The present invention is related to an indicating apparatus, particularly to an indicating knob apparatus for tuners and other devices which receive mutually differing frequency bands.

Heretofore in this type of tuner which receive mutually differing frequency bands, as for example in television tuners and other devices receiving both VHF and UHF bands, the tuning adjustment procedure was complicated because the tuning shaft for the VHF band and the tuning shaft for the UHF band were positioned with mutual separation.

That is, when about to receive the UHF band, it was necessary to follow the complicated procedure of positioning the switching shaft of the VHF band to the position where the UHF band was receivable, and next adjusting the UHF band tuning shaft separately located from the VHF switching shaft.

Thus, the present invention has as an object to eliminate the aforementioned disadvantage.

The main object of the present invention is to provide an indicating apparatus which will enable tuning with facility.

Another object of the present invention is to provide an indicating apparatus in which indicating of the tuning adjustment operation is obtainable on the same knob for tuners which receive mutually differing frequency bands.

Still another object of the present invention is to provide an indicating knob suitable for a tuner driving device with which adjustment of the respective tuners for reception of mutually differing frequency bands may be performed by means of the same knob.

For a better understanding of the invention, reference is made to the accompanying drawings, in which, FIG. 1 is an exploded perspective view of one embodiment of the apparatus according to the present invention;

Figure 1:
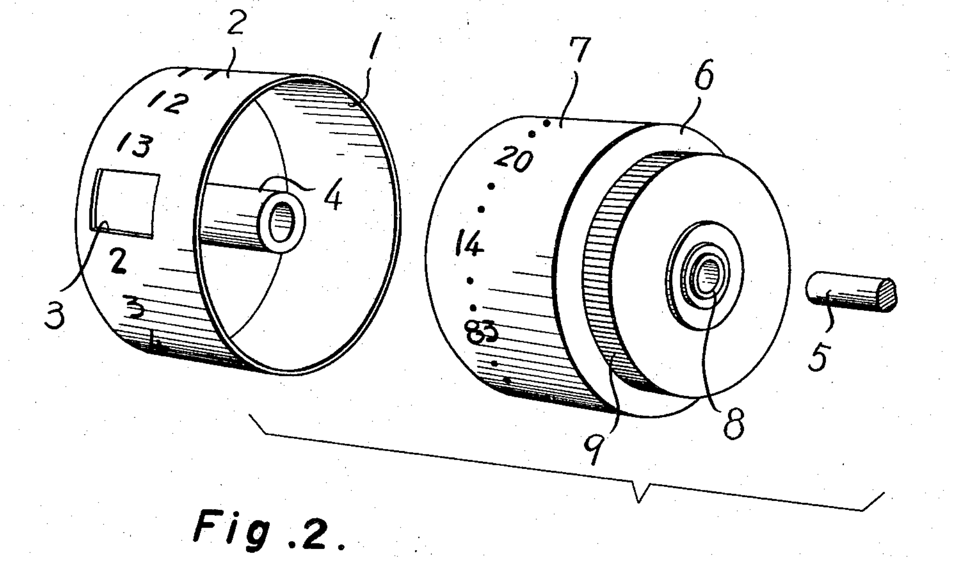
Figure 2:
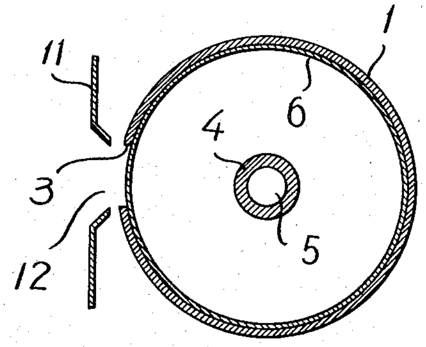
FIG. 2 is a side view showing the condition thereof in use.
Figure 3:
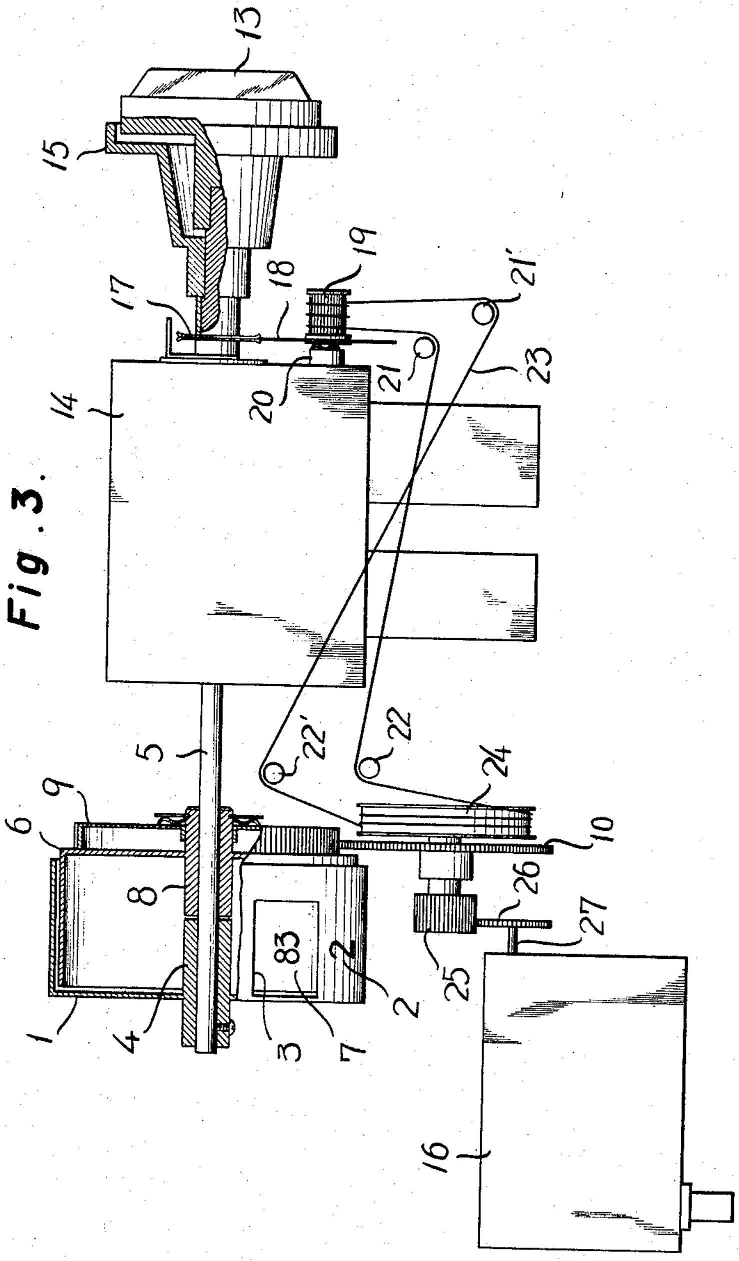
FIG. 3 is a side view partly in section showing one embodiment of the apparatus according to the present invention connected to separate tuners.

In FIGS. 1–3, 1 denotes the indicating drum of the VHF band, 2 denotes the channel indicating band on the surface of said drum and Nos. 2 . . . 13 are indicated thereon, and a viewing window 3 is cut in the drum between Nos. 13 and 2.

Hollow shaft 4 is arranged in the indicating drum 1 and is fixed to the rotary shaft 5 of the VHF tuner rotatably therewith. The indicating drum 6 of the UHF band is inserted to be free rotatably in the indicating drum 1.

The indicating band 7 is on the surface of said drum 6, has numbers on its surface in such a way that said numbers can be read through the viewing window 3 when the drum 6 is inserted in the indicator drum 1 of the VHF band. The hollow shaft 8 is freely rotatably mounted on the rotary shaft 5. The gear wheel 9 is mounted on the outside of the indicating drum 6 of the UHF band and can rotate in mesh with the gear wheel 10. An opaque mask 11 is fitted suitably to the chassis etc. and has a viewing window 12. A knob 13 is provided for the VHF band and by rotating this knob, VHF tuner 14 can be changed and at the same time the rotary shaft 5 can be rotated. Fine adjustment knob 15 can adjust the VHF tuner finely and at the same time can effect the tuning of the UHF tuner 16 too. A friction wheel 17 is wheel rotatable with said knob. A friction disc 18 is engaged frictionally with said friction wheel and is fixed to the friction wheel 19 and to the fine adjusting shaft 20 of the VHF tuner, said wheel 19 and said shaft 20 being coaxial.

Rope pulleys 21, 21', 22, 22' hold the rope 23 free slidably thereon. 24 is a friction wheel. Said rope 23 is held by the friction wheel 19, rope pulleys 21, 22, friction wheel 24, rope pulleys 22', 21' in succession and transmits the rotation of the friction wheel 19 to the friction wheel 24. Gear wheel 25 is mounted on the same shaft as the friction wheel 24 and the gear wheel 10. Gear wheel 26 meshes with the gear wheel 25 and is fixed to the tuning shaft 27 of the UHF tuner 16.

Now, operation thereof is explained as follows: When the normal VHF band is to be received, the operation is the same as the receiving operation for ordinary television receivers, namely, the knob 13 for VHF band is rotated for selecting the desired channel, thereafter the adjusting knob 15 is rotated to obtain the accurate tuning. In this case, when the knob 13 for the VHF band is rotated, the rotary shaft 5 is rotated and accordingly the indicating drum 1 for VHF band is rotated, the number of the desired channel among the numbers 2 . . . 13 on the indicating band 2 of said drum can be seen outside through the viewing window 12. Further, when the adjusting knob 15 is rotated, the frictional wheel 17 is rotated therewith and accordingly the frictional disc 18 attached to the fine adjustment shaft 20 of the VHF tuner is rotated. The VHF tuner 14 can be finely adjusted.

When the reception of the UHF band is desired, at first, the VHF knob 13 is turned to the position where the UHF band can be received, thereafter the adjusting knob 15 is rotated, in this case, it is constructed in such a way that when the VHF knob 13 is rotated to the position where the UHF band can be received, the viewing window 3 of the VHF band indicating drum 1 coincides with the viewing window 12 of the mask 11. And when the fine adjusting knob 15 is rotated, the friction wheel 17, the friction disc 18 meshing frictionally therewith and the friction wheel 19 of the same shaft is rotated, accordingly the friction wheel 24, which is connected to said friction wheel through rope 23, is rotated. In this case, through the gear wheel 25 attached to the same shaft of said wheel 24 and the gear wheel 26, the tuning shaft 27 of the UHF tuner 16 is rotated and by this operation the UHF tuner 16 is tuned accurately to the desired frequency.

In general, the tuning operation of this UHF band is very difficult and needs a fine adjustment, and in order to facilitate the tuning operation, the rotating speed of the tuning shaft 27 is reduced very much by the friction wheels 19, 24, gear wheels 25, 26 etc.

By rotation of said friction wheel 24, the tuning shaft 27 is rotated and at the same time the gear wheel 10 attached to the same shaft as that of the friction wheel is also rotated and the gear wheel 9 meshed therewith rotates, so that the UHF band indicating drum 6 rotates and thus the number on the indicating band 7 may be viewed outside through the viewing windows 3, 12. Thereby, the indicating band 7 of the UHF band indicating drum 6 can be seen through the viewing windows 3, 12 without hindrance of the number of the indicating band 2 of the UHF band indicating drum 1.

Thus as stated above in detail, the aforementioned objects of the present invention have been fulfilled. Also, the present invention is not limited to the embodiments stated above and it goes without saying that various modifications are possible without deviating from the spirit of the present invention.

What we claim is:

1. An indicating apparatus comprising a first rotatable cylindrical indicating drum having an indication band about a portion of the outer periphery thereof, said indicating band having a viewing window in a part of said band, a first tuner receiving electrical signals in a first frequency band, a first rotary shaft operatively connected for adjusting said first tuner, means for rotating said first indicating cylindrical drum and simultaneously rotating said first rotary shaft, a second cylindrical indicating drum having a second indicating band about a portion of the outer periphery thereof, said second indicating drum being mounted coaxially and concentrically within said first drum so as to freely rotate therein, a second tuner receiving an electrical signal of a second frequency band, a second rotary shaft operatively connected for adjusting said second tuner, means for rotating said second cylindrical indicating drum and simultaneously rotating said second rotary shaft, a chassis, an opaque mask having a viewing port provided therein, said mask being mounted on said chassis, said first and said second cylindrical indicating drums being mounted so that each indicating band is visible in said window and said port.

2. An indicating apparatus as described in claim 1 in which said first cylindrical indicating drum is mounted so that only the first indicating band can be viewed through the viewing port of said opaque mask when said first tuner receives an electric signal.

3. An indicating apparatus as described in claim 1 wherein said first and second cylindrical indicating drums are mounted so that the viewing window of said first indicating cylindrical drum is coincident with said viewing port of said opaque mask and the second indicating band of said second indicating cylindrical drum when said second tuner receives an electric signal.

4. An indicating apparatus comprising a first rotatable cylindrical indicating drum having a first indicating band on a portion of its outer periphery thereof, a viewing window in said drum in a portion of said indicating band, a first tuner receiving a first electric signal of a first frequency band, a first rotary shaft operatively connected to adjust said first tuner and simultaneously connected to rotate said first cylindrical indicating drum, a second cylindrical indicating drum having a second indicating band on a portion of the outer periphery thereof, said second indicating drum being inserted coaxially, concentrically and freely rotatably within said first indicating drum, a second tuner receiving a second electric signal of a frequency band different from said first frequency band, a second rotary shaft operatively connected to adjust said second tuner, means for rotating said second indicating drum simultaneously with the rotation of said second rotary shaft, a chassis, an opaque mask having a viewing window provided therein, said mask being mounted on said chassis, said first and said second cylindrical indicating drums being mounted on said chassis so that the indicating bands of said drums can be viewed through the viewing window of said opaque mask when said first tuner receives an electric wave of said first frequency band and the viewing window of said first cylindrical indicating drum is coincident with the viewing window of said opaque mask and the indicating band of said second indicating cylindrical drum can be viewed through said viewing windows when said second tuner receives an electric wave of said second frequency band.

5. An indicating apparatus as claimed in claim 4 wherein said first frequency band received by said first tuner is the VHF band and said second frequency band received by said second tuner is the UHF band.

References Cited

UNITED STATES PATENTS

| | | | |
|---|---|---|---|
| 1,923,759 | 8/1933 | Smith | 116—129 |
| 2,084,217 | 6/1937 | Qvintavalle | 116—124.4 |
| 2,772,351 | 11/1956 | Machlin | 116—124.1 |
| 2,851,002 | 9/1958 | Angst | 116—129 |
| 2,942,108 | 6/1960 | Goldstein et al. | 250—40 |
| 3,179,003 | 4/1965 | Tompson | 88—24 |
| 3,181,497 | 5/1965 | Tompson | 116—124.4 |

LOUIS J. CAPOZI, *Primary Examiner.*